United States Patent [19]

Murray et al.

[11] Patent Number: 5,317,866
[45] Date of Patent: Jun. 7, 1994

[54] FREE-FLYING TUBULAR VEHICLE

[75] Inventors: Stephen B. Murray; Joseph L. D. S. Labbé; Paul A. Thibault, all of Medicine Hat, Canada

[73] Assignee: Her Majesty the Queen in right of Canada, as represented by the Minister of National Defence of Her Majesty's Canadian Government, Ottawa, Canada

[21] Appl. No.: 946,228

[22] Filed: Sep. 18, 1992

[51] Int. Cl.$^5$ .............................................. F02K 7/08
[52] U.S. Cl. ..................................... 60/204; 60/270.1
[58] Field of Search ................. 60/270.1, 39.461, 204; 102/503

[56] References Cited

U.S. PATENT DOCUMENTS

| | | | |
|---|---|---|---|
| 3,032,977 | 5/1962 | Neitzel | 60/270.1 |
| 3,355,891 | 12/1967 | Rhodes | 60/270.1 |
| 3,667,233 | 6/1972 | Curran et al. | 60/270.1 |
| 3,783,616 | 1/1974 | Norman et al. | 60/270.1 |
| 3,974,648 | 8/1976 | Kepler | 60/270.1 |
| 4,170,110 | 10/1979 | Radin | 60/270.1 |
| 4,301,736 | 11/1981 | Flatau et al. | 102/503 |
| 4,821,512 | 4/1989 | Guile et al. | 60/270.1 |
| 5,058,826 | 10/1991 | Coffinberry | 60/270.1 |
| 5,082,206 | 1/1992 | Kutschenreuter et al. | 60/270.1 |

OTHER PUBLICATIONS

Bruckner, A. P. et al., "Investigation of Gasdynamic Phenomena Associated with the Ram Accelerator Concept", AIAA Paper 87-1327, Jun., 1987.
Hertzberg, A. et al., "Ram Accelerator: A New Chemical Method for Accelerating Projectiles to Ultrahigh Velocities", AIAA Journal, vol. 26, pp. 195-203, Feb. 1988.
Bruckner, A. P. et al., "Investigation of Superdetonative Ram Accelerator Drive Modes", Report prepared for the Office of Naval Research, Arlington, Va., by Aerospace & Energetics Research Program, University of Washington, Dec. 1989.
M. Giraud et al., "Ram Accelerator in 90 mm Caliber: First Results Concerning the Scale Effect in Thermally Choked Propulsion Mode", Thirteenth International Symposium on Ballistics, Stockholm, Sweden, Jun. 1-3, 1992.
Hertzberg, A. et al., "The Ram Accelerator and Its Applications: A New Approach for Reaching Ultrahigh Velocities", Aerospace and Energetics Research Program, University of Washington, Seattle, Wash. Date Unknown.
J. Rom and G. Avital, "The External Propulsion Accelerator: Scramjet Thrust Without Interaction of Accelerator Barrel", AIAA 92-3717 AIAA/SAE/ASME/ASEE 28th Joint Propulsion Conference, Jul. 6-8, 1992 Nashville, Tenn.

*Primary Examiner*—Richard A. Bertsch
*Assistant Examiner*—Howard R. Richman
*Attorney, Agent, or Firm*—Roylance, Abrams, Berdo & Goodman

[57] ABSTRACT

A relatively low drag, completely free-flying, tubular vehicle comprises a body that defines a leading edge and a trailing edge and includes an external surface and an internal surface each extending from the leading to the trailing edge. The internal surface has an axially converging upstream section extending from the leading edge to a discontinuity that constitutes a throat in the vehicle. The internal surface also has an axially diverging downstream section extending from the throat to the trailing edge. The internal surface is configured to enable introduction and mixing of fuel into an airstream flowing therethrough, and to generate a shock wave when in flight. The shock wave is of such magnitude and direction as to create a hot spot that subsequently causes ignition and combustion of the fuel-air mixture. The combustion causes formation of a detonation bubble and migration of the associated wave front upstream to stabilize slightly downstream of the throat. The combustion of the fuel results in rapid expansion of combustion products, generating forward thrust against the internal surface of the vehicle.

19 Claims, 5 Drawing Sheets

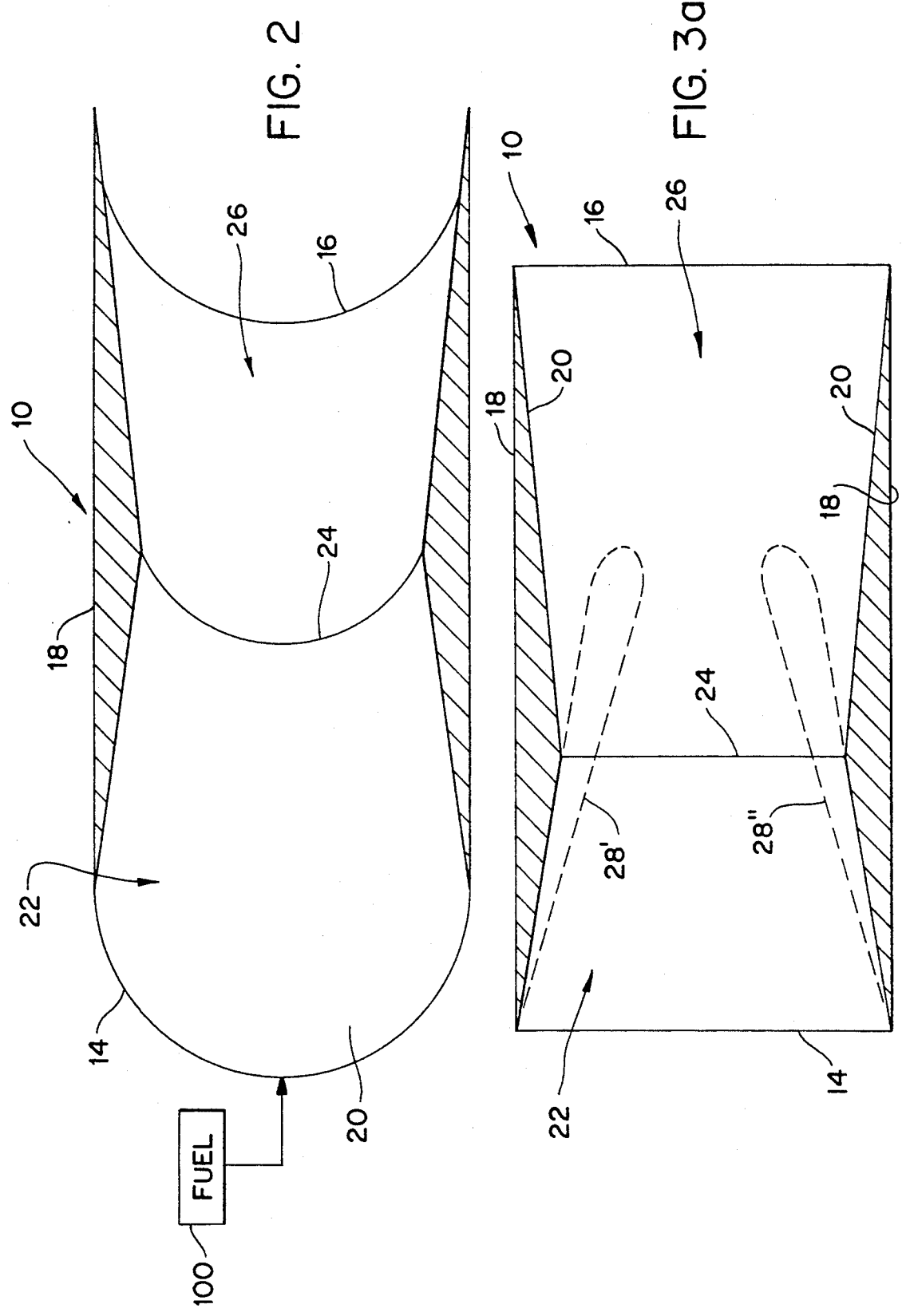

FREE-FLYING TUBULAR VEHICLE

BACKGROUND OF THE INVENTION

1. Field of the Invention

This invention pertains to free-flying power plants of use as aerial targets, projectiles or aircraft engines More particularly, this invention pertains to a relatively low drag, completely free-flying, tubular vehicle operable to achieve supersonic combustion in hypersonic flow at atmospheric pressure.

2. Description of Related Prior Art

To propel a free-flying vehicle has generally involved producing a fuel-air mixture and combusting the fuel-air mixture to produce thrust against the vehicle. The flight speed of such a vehicle is proportional to the flow speed of the fuel and air relative to the vehicle and to the speed of combustion of the fuel-air mixture.

Prior art free-flying vehicles have included conventional ramjets, supersonic combustion ramjets, ram accelerators and external propulsion accelerators.

Ramjets comprise a cylindrical cowling around, and spaced apart from, an elongate centrebody. Flow enters a conventional ramjet between the cowling and the centrebody and does so supersonically. However, that flow is made to pass through a shock wave. Three drawbacks result from such passage: (i) combustion of fuel-air mixture takes place at subsonic conditions, (ii) there is significant time for mixing to take place between the fuel and the air and (iii) flame holders are required to stabilize the combustion zone. As a result, conventional ramjets have achieved maximum flight speeds of approximately only Mach 6.

To overcome those drawbacks, and to reach higher flight speeds, supersonic combustion ramjets were developed. In such ramjets the following occurs: (i) rapid shock heating of fuel-air mixture to a temperature greater than its ignition temperature and (ii) subsequent rapid combustion leading to a standing detonation wave downstream from where the fuel is introduced, the standing detonation wave being stabilized over the operational range of flight speeds. As a result, with such ramjets the fuel-air mixture combusts supersonically producing flight speeds up to approximately Mach 8.

Still higher flight speeds are desired, so ram accelerators have been developed. A ram accelerator is basically a ramjet-in-tube device comprising a projectile in a tube. The projectile resembles the centrebody of a ramjet and is accelerated by the release of combustion energy in a stationary tube filled with a combustible gas mixture at approximately 16 to 31 atmospheres. The tube acts like the cowling of a conventional ramjet and the energy release process moves along with the projectile. The projectile can reach speeds greater than Mach 8.

However, ram accelerator combustion requires specific relative shapes and sizes for the projectile and tube. Passage of the front portion of the projectile through the ga must not only compress the gas, without igniting it, but also result in a shock wave being reflected off of the tube. The reflected shock wave then produces a standing detonation wave, outside and behind the projectile, which propels the projectile. As well, it is not clear whether a ram accelerator would work if the reactive gases were not initially at elevated pressure. The use of the tube and of the pressurized gases in the tube therefore means that the projectile cannot be completely free-flying.

External propulsion accelerators are an improvement on ram accelerators. External propulsion accelerators are like ram accelerators in two ways. First, a projectile resembling the centrebody of a ramjet is accelerated by the release of combustion energy in a stationary tube filled with a pressurized combustible gas mixture further compressed by the passage therethrough of the front portion of the projectile. Second, the energy release process moves along with the projectile. However, unlike a ram accelerator, the tube is not used to produce a reflected shock wave and thence to produce a standing detonation wave to propel the projectile. Instead, a standing detonation wave is produced by a blunt step or notch on the outside of the middle of the projectile. The blunt step or notch ignites the gas already compressed by the forward portion of the projectile. It has therefore been theorized that if on-board fuel could be effectively introduced into combustion zones external to the projectile then the projectile could be completely free-flying and reach speeds greater than Mach 8. However, a disadvantage is that the blunt step or notch of the projectile presents a large cross sectional area to the oncoming flow, resulting in very significant levels of aerodynamic drag and hence in reduced flight speed and high specific fuel consumption.

SUMMARY OF THE INVENTION

It is therefore desirable to produce a relatively low drag, completely free-flying, vehicle operable to achieve supersonic combustion in hypersonic flow at atmospheric pressure. Such a vehicle would not need the tube found in ram or external propulsion accelerators and would have less aerodynamic drag than an external propulsion accelerator projectile of comparable size.

The present inventors have found that such a result may be achieved by a tubular vehicle having a central cavity shaped and sized to create a shock wave in a fuel-air mixture in that cavity, the shock wave having magnitude and direction to cause a standing detonation wave in the cavity, thereby propelling the vehicle.

Accordingly, the present invention provides a free-flying tubular vehicle operable to be propelled at supersonic speeds of flight along a predetermined trajectory by means of a standing detonation wave front, said vehicle comprising a body that defines a leading edge and a trailing edge, and which includes an external surface and an internal surface, said internal surface and said external surface extending from said leading edge to said trailing edge, said internal surface having an axially converging upstream section extending from said leading edge towards a throat and being configured to enable introduction and mixing of fuel into an airstream flowing therethrough and to generate a shock wave when in flight, said shock wave being of such magnitude and direction as to create a hot spot that subsequently causes ignition and combustion of the fuel-air mixture, said combustion causing formation of a detonation bubble and migration of the associated wave front upstream to stabilize slightly downstream of said throat, whereby the combustion of said fuel results in rapid expansion of combustion products that generate forward thrust against the internal surface of said vehicle.

BRIEF DESCRIPTION OF THE DRAWINGS

In drawings illustrating embodiments of the invention,

FIG. 2 is a cross-sectional perspective view facing the plane defined by the lines A—A' and B—B' in FIG. 1, FIGS. 3a through 3g are cross-sectional side views facing the plane defined by the lines A—A' and B—B' in FIG. 1 and illustrating the sequence of events from the beginnings of flow to the formation of a stabilized wave front.

DESCRIPTION OF PREFERRED EMBODIMENT

In all of FIGS. 1, 2 and 3a through 3g, the flow is from left to right

Figure 1:
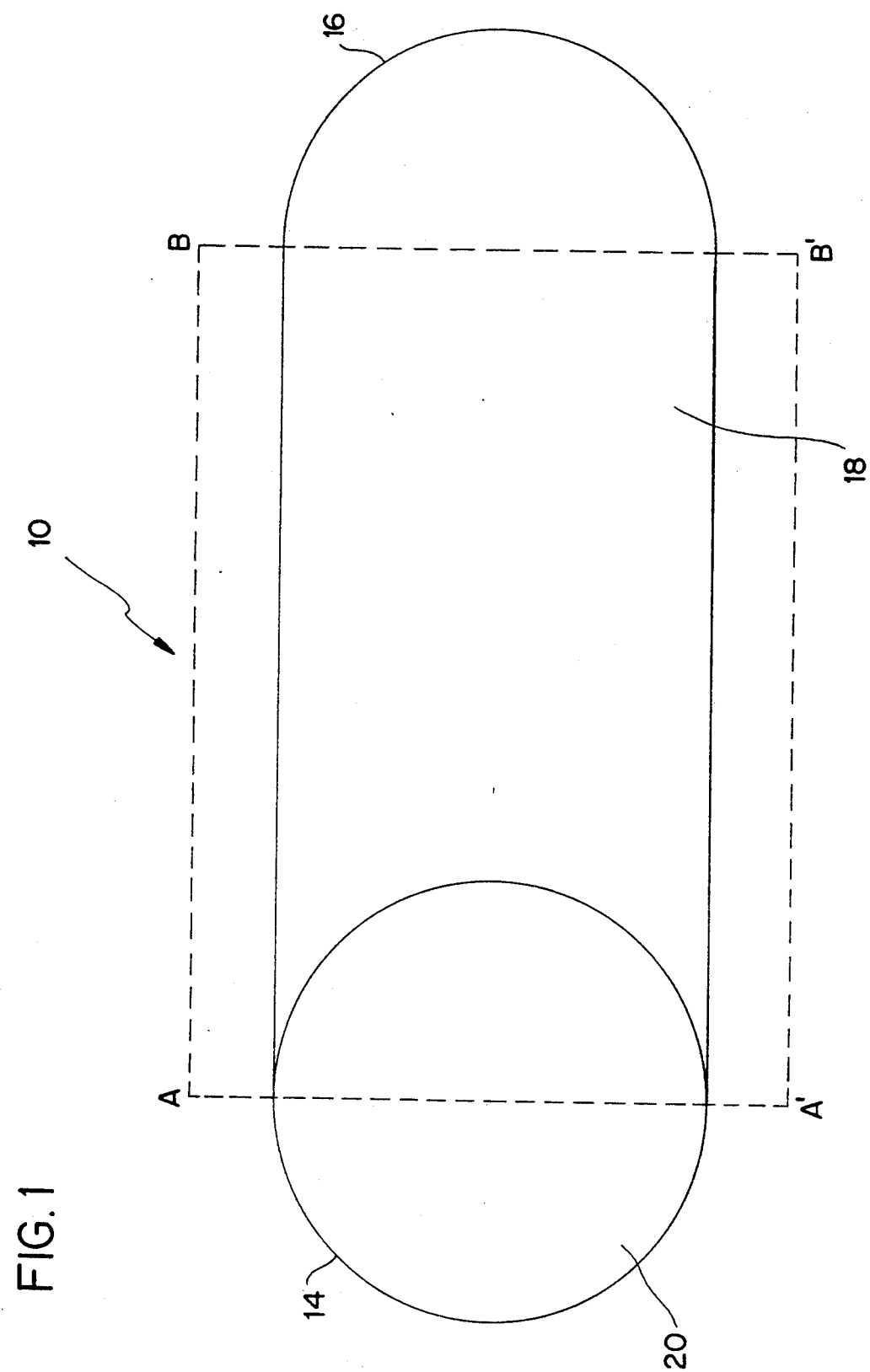
FIG. 1 is a perspective view of a preferred embodiment.

Referring to FIG. 1, in a preferred embodiment the vehicle 10 comprises a right-circular cylindrical body that is 400 mm long and has an outside diameter of 200 mm. The body includes a circular leading edge 14 and a circular trailing edge 16, and includes an external surface 18 and an internal surface 20. The surfaces 18 and 20 extend from the leading edge 14 to the trailing edge 16.

Referring to FIG. 2, the external surface 18 is a right-circular cylinder. The internal surface 20 is machined to include a radially converging upstream section 22 extending from the leading edge 14 to a discontinuity that constitutes a throat 24 in the vehicle 10. The diameter of the throat 24 is 150 mm, which is also the distance of the throat 24 from the leading edge 14 as measured along the external surface 18. The region forward of the throat 24 functions as an engine inlet. The internal surface 20 is also machined to have a radially diverging downstream section 26 extending from the throat 24 to the trailing edge 16. The region aft of the throat 24 functions as a nozzle.

Referring to FIG. 3a, the upstream section 22 is configured to enable introduction and mixing of acetylene from fuel means 100 (FIG. 2) at 1 atmosphere and 298K into a Mach 6 airstream flowing therethrough, such that the flow within the vehicle 10 is closely representative of stoichiometric acetylene-air at atmospheric pressure. The upstream section 22 is also configured to generate an oblique shock wave therein, represented by individual wave fronts 28' and 28''. Within approximately the first 0.1 ms of flow the shock wave, represented by individual wave fronts 28' and 28'', develops rearwardly from the leading edge 14 and extends past the throat 24 toward the trailing edge 16. In FIG. 3a the shock wave has increased the temperature of the fuel air-mixture but not up to or past the point of ignition.

Figure 3B:
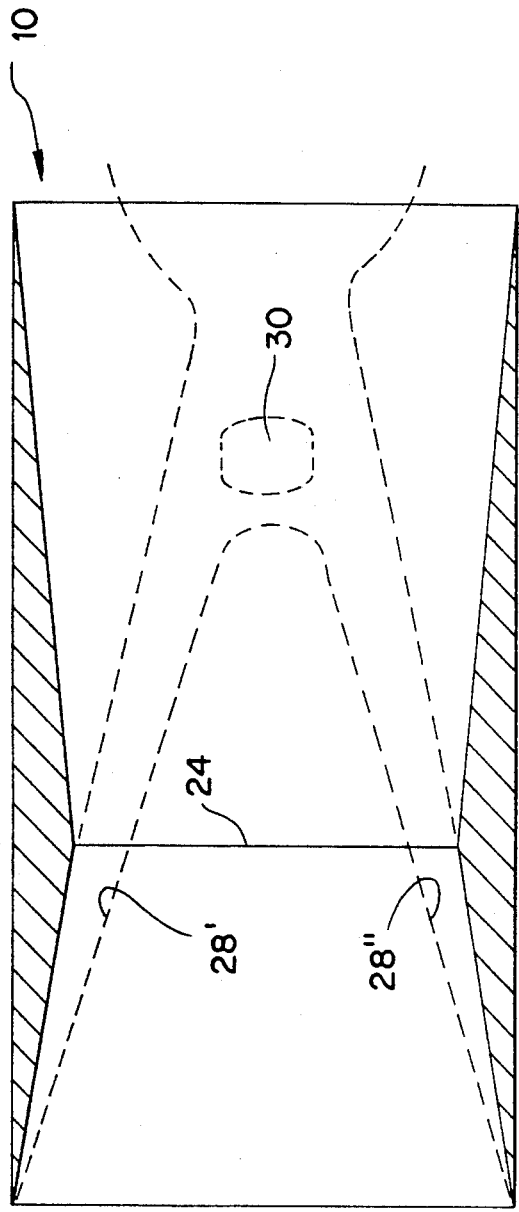

Referring to FIG. 3b, between approximately 0.1 ms and 0.2 ms of flow the shock wave, represented by individual wave fronts 28' and 28'', has converged on the longitudinal axis of the vehicle 10. The converging shock wave is of such magnitude and direction as to create a hot spot 30 along the axis of the vehicle 10 after approximately 0.2 ms of flow.

Figure 3C:
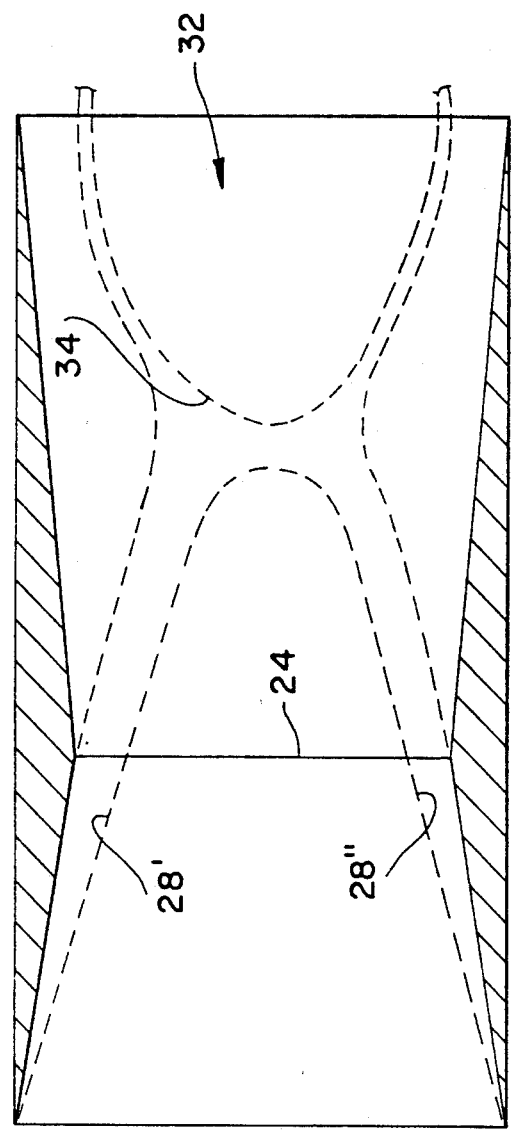
Figure 3D:
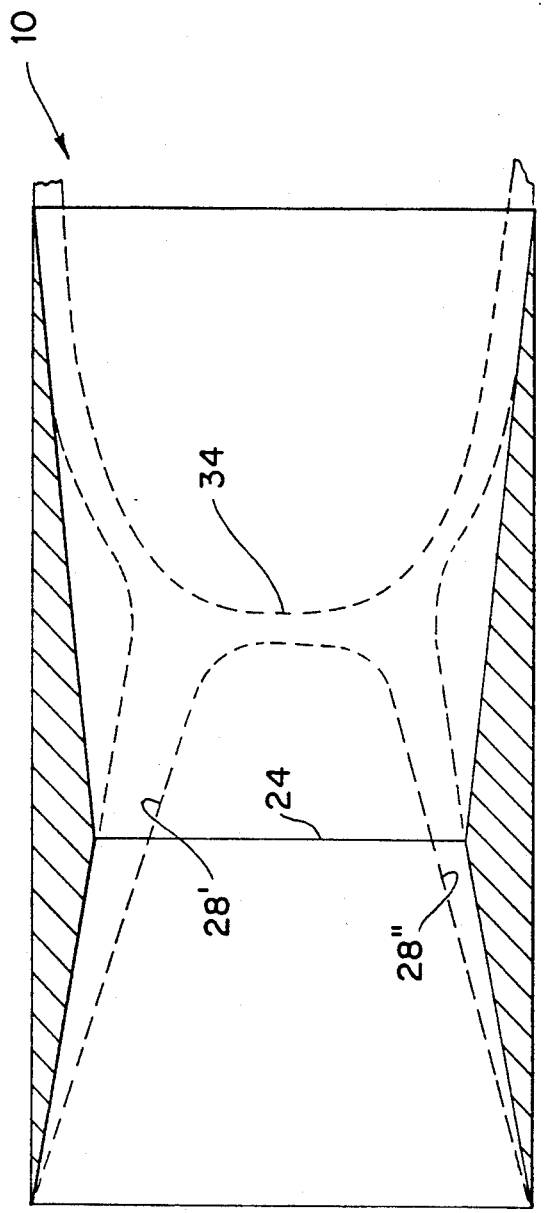
Figure 3E:
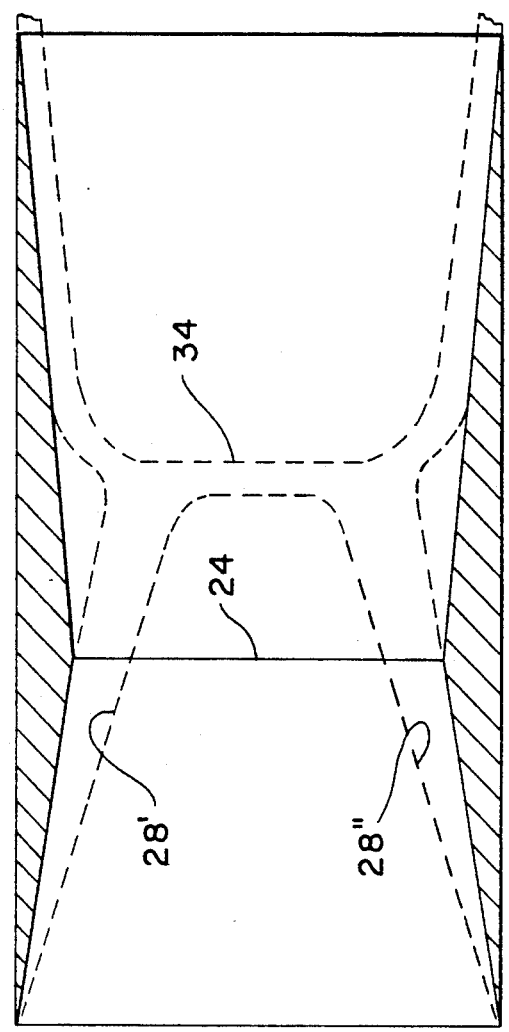
Figure 3F:
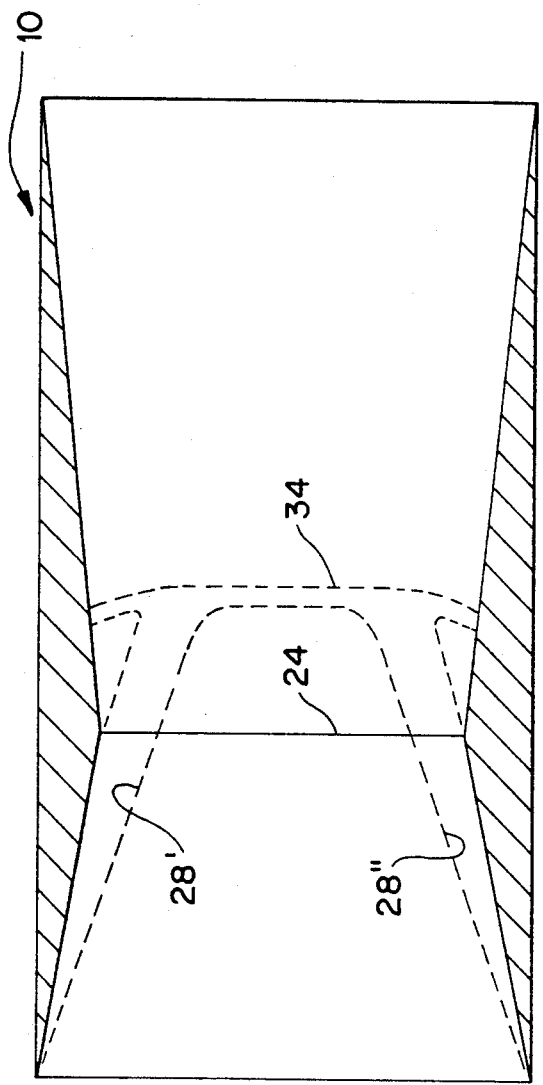
Figure 3G:
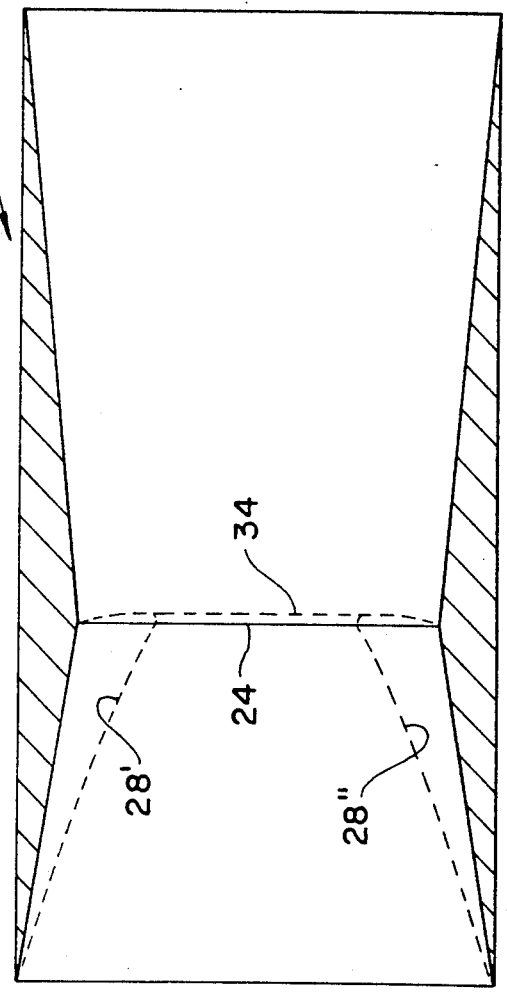

Referring to FIG. 3c, at approximately 0.4 ms of flow the hot spot 30 has caused ignition and combustion of the fuel-air mixture at Mach 5.3. That combustion causes formation of a detonation bubble 32 and migration (FIGS. 3d, 3e and 3f covering from approximately 0.4 ms to approximately 300 ms) of the associated wave front 34 upstream. After an elapsed flow time of approximately 700 ms, the wave front 34 stabilizes slightly downstream of the throat 24 (FIG. 3g).

To use the vehicle 10 as an aerial target or projectile, flow through it may be started by launching it from a gun. To use the vehicle 10 as an aircraft engine, flow through it may be started by "piggy-backing" on other aircraft.

Figure 4:
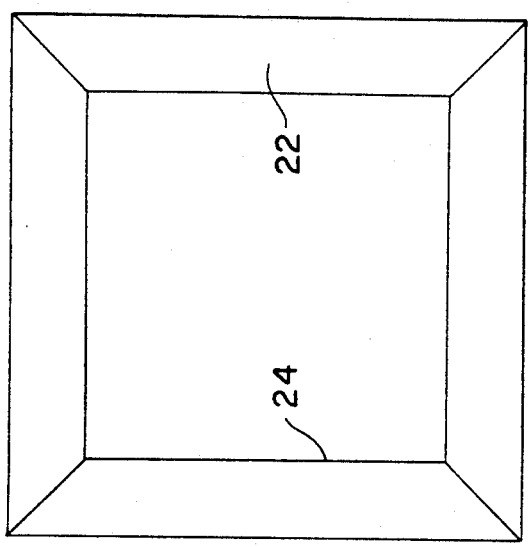
FIG. 4 is an end elevational view of a tubular vehicle according to a second embodiment of the present invention.

Although the present specification and drawings discloses a preferred embodiment, it will be apparent to those skilled in the art that the present invention is not restricted to that embodiment but may instead be varied within the scope of the following claims without departing from the spirit of the invention. For example, the cross-section of the body may be other than circular, including, but not limited to, other axis-symmetrical shapes such as squares (FIG. 4). As well, the inlet region could incorporate a low-loss Buseman type inlet and the nozzle region could be flared.

We claim:

1. A method of operating a free-flying tubular vehicle for flight at supersonic speeds along a predetermined trajectory by a standing detonation wave front, comprising the steps of:

introducing and mixing fuel into an airstream flowing through a body having a leading edge, a trailing edge, an external surface and an internal surface, the internal surface and the external surface extending from the leading edge to the trailing edge, the internal surface being of fixed geometry and having an axially converging upstream section extending from the leading edge towards a throat;

generating a shock wave in flight, the shock wave having a magnitude and direction to create a hot spot downstream of the throat;

subsequently igniting and combusting the fuel-air mixture by the hot spot;

forming a detonation bubble by combustion of the fuel-air mixture;

migrating an associated wave front of the detonation bubble upstream to stabilize the wave front slightly downstream of the throat; and generating forward thrust against the internal surface of the vehicle by combustion of the fuel producing rapid expansion of combustion products.

2. The method of claim 1 wherein
   the internal surface includes an axially diverging section extending from the throat toward the trailing edge.

3. The method of claim 1 wherein
   the flow within the body is hypersonic and combustion is supersonic.

4. The method of claim 1 wherein the fuel is acetylene; and
   the acetylene-air mixture is substantially stoichiometric at atmospheric pressure.

5. The method of claim 1 wherein
   the fuel is combusted solely by the detonation wave without an ignitor.

6. The method of claim 1 wherein
   the distance the throat is downstream of the leading edge is substantially equal to the diameter of the throat.

7. A free-flying tubular vehicle operable to be propelled at supersonic speeds of flight along a predetermined trajectory by a standing detonation wave front, said vehicle comprising:

a body having a leading edge, a trailing edge, an external surface and an internal surface, said internal surface and said external surface extending from said leading edge to said trailing edge, said internal surface being of fixed geometry having an axially converging upstream section extending from said leading edge towards a throat and having means for enabling introduction and mixing of fuel into an airstream flowing therethrough and for generating a shock wave when in flight, said shock wave being of such magnitude and direction as to create a hot spot downstream of said throat that subsequently causes ignition and combustion of the fuel-air mixture, said combustion causing formation of a detonation bubble and migration of the associated wave front upstream to stabilize slightly downstream of said throat;

whereby the combustion of the fuel results in rapid expansion of combustion products that generate forward thrust against said internal surface.

8. The vehicle of claim 1, wherein said internal surface includes an axially diverging section extending from said throat toward said trailing edge.

9. The vehicle of claim 2, wherein said throat comprises a discontinuity of said internal surface.

10. The vehicle of claim 3, wherein said body is of axis-symmetrical cross section.

11. The vehicle of claim 4, wherein said axis-symmetrical cross-section is square.

12. The vehicle of claim 4, wherein said axis-symmetrical cross-section is circular.

13. The vehicle of claim 6, wherein the distance said throat is downstream of said leading edge is substantially equal to the diameter of said throat.

14. The vehicle of claim 1, wherein the flow within said body is hypersonic and combustion is supersonic.

15. The vehicle of claim 7 wherein
the fuel introduced by said means is acetylene; and
said means introduces and mixes the fuel to produce an acetylene to air mixture which is substantially stoichiometric at atmospheric pressure.

16. The vehicle of claim 8 wherein
the fuel introduced by said means is acetylene; and
said means introduces and mixes the fuel to produce an acetylene to air mixture which is substantially stoichiometric at atmospheric pressure.

17. The vehicle of claim 10 wherein said axis-symmetrical cross section is rectangular.

18. The vehicle of claim 7 wherein said body does not have an ignitor for combusting the fuel, the fuel being detonated solely by the shock wave.

19. The vehicle of claim 7 wherein said body, radially inside of said internal surface, is completely open.

* * * * *